Feb. 18, 1958  E. F. HISCOCK  2,824,002
METHOD OF PROVIDING A COFFEE PACKET
Filed April 9, 1952

Inventor
Earle F. Hiscock

By
Attorneys

United States Patent Office 2,824,002
Patented Feb. 18, 1958

2,824,002
METHOD OF PROVIDING A COFFEE PACKET

Earle F. Hiscock, Washington, D. C., assignor to Kip, Inc., Washington, D. C., a corporation of Delaware Application April 9, 1952, Serial No. 281,354

1 Claim. (Cl. 99—77.1)

This invention relates to the production of bags or sacks generally referred to as infusors, comprising a porous envelope of material which is chemically inert as to taste and receiving a material adapted to be infused in a liquid.

The primary object of this invention is the provision of a method of producing a disposable coffee unit including a sack or container receiving comminuted coffee therein, and which container is formed of suitable porous material chemically inert, as to taste, so that the resulting brew has none of the natural coffee tastes and aroma blanked out.

A further object of this invention is the provision of an improved method of producing a method for the fabrication and production of disposable coffee units or sacks.

A further object of this invention is the provision of an improved disposable coffee sack or unit adaptable for use in connection with vacuum type coffee makers for the production of a coffee brew containing all natural flavors and aroma of the taste spectrum and free of foreign tastes such as are ordinarily imparted to coffee thru the use of infusors which are not chemically inert as to taste.

A further object of this invention is the provision of an improved method of producing a disposable coffee unit wherein comminuted coffee is contained within a bag which is chemically inert to taste, and of sufficient rugged mechanical strength to withstand the surging and squeezing forces imparted thereto during the coffee brewing action within coffee makers, such as set forth in U. S. Patents 2,745,335; 2,746,376; 2,749,834 and 2,749,835.

Other objects and advantages of this invention will be apparent during the course of the following detailed description.

In the accompanying drawing, forming a part of this specification, and wherein for the purpose of illustration is shown only a preferred embodiment of the improved disposable coffee unit and the steps of manufacturing the same:

Figure 1:
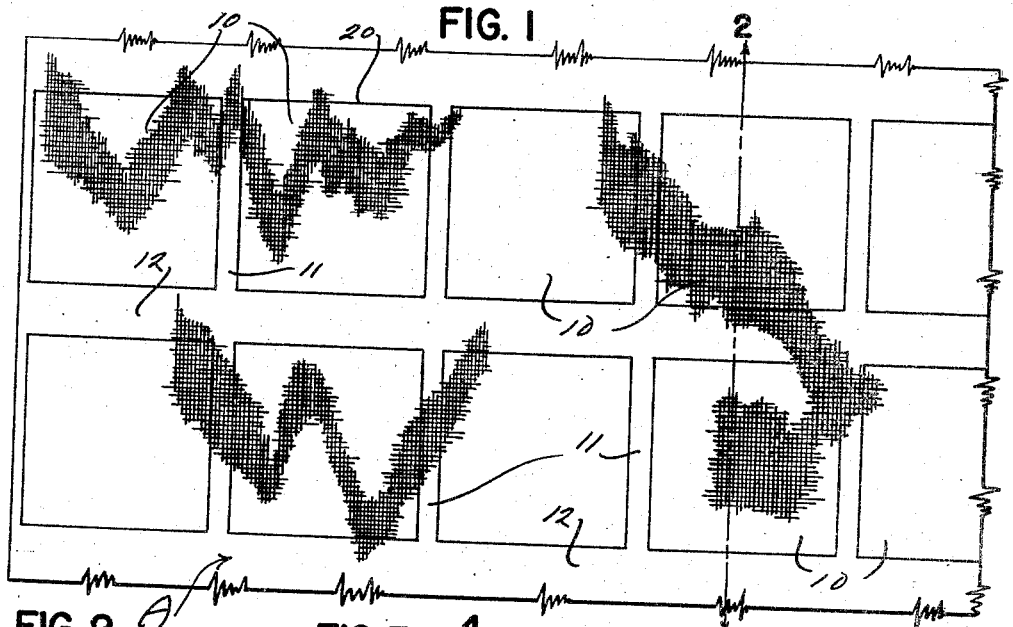
Figure 1 is a fragmentary plan view of material used to manufacture the sacks or coffee packets.

The disposable coffee packet or unit comprising the invention, while adaptable for use with conventional coffee makers and brewers is primarily for use within vacuum type coffee makers of the types described and set forth in U. S. Patents 2,745,335; 2,746,376 and 2,749,835. Such relate to improved methods and apparatus for the efficient brewing of coffee, wherein comminuted coffee disposed in porous sacks or bags is placed across the venting passageway between the upper and lower receptacle portions of the vacuum type coffee maker and maintained in such position under a yieldable force which imparts a squeezing action to the packet under the influence of the surging boiling liquor, for the quick and efficient brewing of a coffee having extraordinary flavorable aromatic qualities. With such type of apparatus it is obvious that the sack or container must be of rugged mechanical strength because of the squeezing and agitation imparted thereto. The porous material of which the container is made must be chemically inert as to taste, for otherwise the organic and other foreign materials ordinarily present will blank out part of the flavor spectrum of the coffee used or impart foreign tastes thereto.

Staudinger and Reichstein (U. S. Patent 1,696,419) obtained the following substances from roasted coffee by vacuum distillation: acetaldehyde, furan, furfuraldehyde, furfuryl alcohol, pyridine, hydrogen sulfide, diacetyl, methyl mercaptan, furfuryl mercaptan, dimethyl-sulphide, acetalpropionyl, acetic acid, guaiacol, vinylguaiacol, pyracine, and N-metholpyrrole.

In the aroma they found among other substances: hydrogen sulphide, methyl-mercaptan, furfuryl-mercaptan and higher mercaptans, dimethyl-sulphide and higher sulphides, acetaldehyde, methylethylacetaldehyde, furfurol, methyl-furfurol, acetone, higher aliphatic aldehydes and ketones of the furane series, diacetyl- and acetyl-propionyl, oxy-sulphides and mercaptales of carbonyl compounds with the above mentioned mercaptan, methylalcohol, higher aliphatic alcohols, acetol, furfuryl-alcohol, acetic acid, isovaleric acid and higher fatty acids, palmitic acid, esters of the former two acids with the mentioned alcohols, phenol, catechol, guaiacol, vinylguaiacol, 2,3-dioxyacetophenone, further phenols and phenol ethers of a higher valence, maltol, pyridine, pyracine, methyl-pyracine, 2,5 and 2,6 dimethyl-pyracine, higher homologues of pyracine, N-methyl-pyrrole, N-furfuryl-pyrrole, further higher pyrroles and derivatives of furane and finally naphthalene.

"In the natural aroma are to be found alcohols and acids which react to form esters at elevated temperatures" so that besides these free compounds all these esters are also present as well as the esters formed by the acids with the phenols and mercaptans.

It has heretofore been proposed to use porous containers for receiving soluble and other types of coffees, but without much thought as to interference with the aromatic and flavorable qualities of the brew, as the result of the materials used. Extensive experiments conducted by me have shown the following:

(1) Filter paper of sufficiently high wet strength to resist boiling water has a resin content and in some cases added vinyl or like fusible agents used for heat sealing purposes. Such ingredients react with the coffee to the impairment of flavor and aromatic quality.

(2) The use of cotton containers was found to impart lint tastes. No matter what the treatment of the cotton fabric, (mercerized or pure cotton) such as boiling in pure water, did not free it of ingredients which imparted to the beverage either foreign tastes or blanked out some of the flavorable qualities of the coffee. Presumably, even after attempts to desize the yarn by boiling, such tastes were imparted because of vegetable waves, lignins and other impurities such as tiny resin sacks of vegetable origin which upon bursting release a black substance resembling tar. This substance has even been found to be insoluble in petroleum solvents.

(3) It would be very desirable to use porous materials such as cellulose acetate rayon because of the good plastic and heat sealing qualities thereof. All of my attempts to remove taste interference from fabric of cellulose acetate resulted in failure because the plastic agent undoubtedly reacts in some way with the ketones and esters in the coffee. Even the so-called "taste-free" non-woven sheets of synthetic materials were found by me to be bound with cellulose acetate; cellulose esters; cellulose ethers; vinyl compounds and their polymers. Whatever the plasticizer used in combination with acetate rayon fiber, I found that subjection to long boiling periods would not entirely remove the same, and that there was always a reaction between the plasticizer, rayon fabric and coffee brew resulting in lack of proper taste and aromatic qualities of the resultant brew.

(4) Protein fibers or wool substitutes are not suitable for coffee sacks of the type herein described, since their wet strength is poor. They are reactable and the process by which they are produced involves the use of residual material of an objectionable nature.

(5) The polymeric vinyl compounds are of no value to provide taste free bag material for infusors of the kind herein described.

My investigation of the question of taste, generally has proven that the only taste-free bag or sack materials for use in coffee brewing are as follows:

(1) Woven nylon, with oils and sizing removed by appropriate boiling in pure water.

(2) Woven viscose rayon of regenerated cellulose yarn, with oils and sizing removed by appropriate boiling in pure water.

I found that the success of coffee brewing, particularly the brewing after the novel methods set forth in my U. S. patents above referred to, require a precise study of the porosity of the sack or container, as well as the amount of comminuted coffee disposed in the container in proportion to the volumetric capacity of the closed container.

So far as the porosity of the container is concerned, and now referring to use of woven nylon and woven viscose rayon made of regenerated cellulose fibers, experiments were conducted with yarn of 150 denier having warp and weft sizes of 126 x 84 down to 72 x 56, and then to 72 x 46 and down to 72 x 42. I found that the coarsest weave which would make the most desirable coffee brew without muddiness and the escape of undesirable ingredients, including suspended particles, was 150 denier yarn woven 72 x 46. As a standard, it is thus desirable that the porosity of the fabric of which the woven bag is constructed should be 150 denier viscose rayon yarn having a warp of 72 and a filler or weft of 42.

Referring now to the amount of coffee used in the sacks or containers, my initial experiments were conducted with the use of commercial woven nylon fabric. I found that initially too much coffee was packed in the bag, and since these bags were primarily intended for use with my method of brewing coffee, according to the teachings of the above identified applications, it was found that the filtering time took too long, because of the use of too much comminuted coffee. One very important characteristic of my improved method of brewing coffee is the fact that some squeezing force, either a weight or spring, must be used to hold the packet in position between the upper and lower receptacles of the vacuum type coffee maker, so that, first, the rising and surging liquor will lift the packet, at least partially, to permit the liquor to promptly and properly enter the upper compartment, second to filter downwardly thru the packet, with the latter acting as a valve between the receptacle portions of the maker. The brewing action must take place in proper time period, and my initial efforts were such that the swelling of the coffee grounds prevented a proper filtering action within the time period desired. Thereafter, I experimented with knitted nylon, having a sufficient stretch to take care of expansion of the coffee grounds. This also did not prove to be entirely satisfactory. Up to this time the woven and knitted fabric bags were quite fully packed, and it was found that the filtering action to produce the proper brew took too long. Also, in the particular method of brewing used by me the weight to hold down the packet pressed too tightly against the bag. This was relieved by varying the degree of weight and also utilizing spring action to hold the packet in proper position, as set forth in U. S. Patents 2,745,335; 2,746,376 and 2,749,835. I then found the degree of looseness of initial packing of coffee in the bag had a great deal to do with the proper circulation of water in and thru the coffee, having in mind proper filtering within brewing time. My original bags were 3" x 3" square, which was later increased to 4" x 4". I found that using a 4½" x 4½" square sack or container in which two ounces of standard drip grind coffee was placed produced optimum results; the total brewing time being two minutes, with a filtering time of one and one half minutes after removal of heat. This gave a true brew of full flavored coffee. Experiments varying the amount of coffee according to the volumetric capacity of the bag were conducted, and I found that the volume of drip grind coffee of from 40% to 60% of the full volumetric capacity of the bag pocket produced proper results, with the optimum result from drip grind coffee filling one half of the volumetric capacity of the bag. The surging and filtering action of the liquor with this proportion and the opimum weave above described, enabled within proper brewing time, a wash out of all coffee solubles not already in solution, with a carry down of just the right amount of suspended particles.

It should be remembered that the coffee packet during the brewing of coffee is subjected to heat application and hot coffee liquor at temperatures ranging from 208° F. to 212° F. for a period of from 2 to 5 minutes. I do not say that other materials will not produce a taste free brewing flavor, since I have in mind the use of a bag made of mono-filaments of glass. That is, glass fiber cloth. However, this is not now generally accepted as safe and suitable for use for beverage or food packing, etc. I have also considered silk, but this is entirely too expensive and has been considered by me as not desirable because it is available in low denier with varying degrees of taste impurities. Likewise, linen fiber is too impure for use.

I desire to use in the containers as above described a coffee grind of the drip designation, the characteristics of which are well known and standardized by the National Coffee Association of U. S. A.

Figure 2:
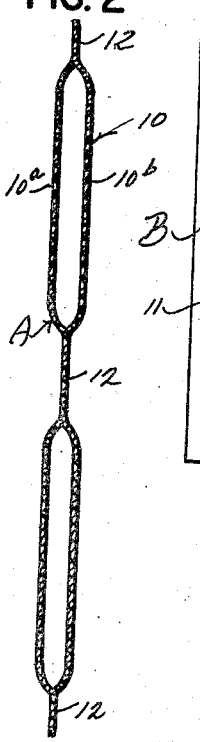
Figure 2 is a vertical cross sectional view taken substantially on the line 2—2 of Figure 1.
Figure 3:
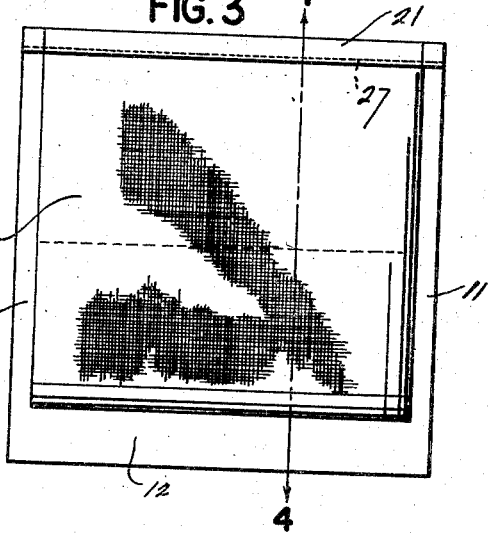
Figure 3 is a front elevation of one of the improved disposable coffee sacks or units.
Figure 4:
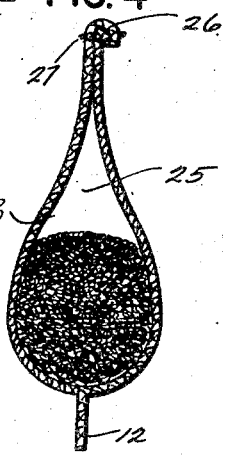
Figure 4 is a vertical cross sectional view taken thru the sack or packet of Figure 3, substantially on the line 4—4 of Figure 3.

In the fabric A of Figures 1 and 2, assuming that the same is woven of yarn, either nylon or viscose rayon, the warp and weft is so-controlled during fabrication as to provide areas 10 of multiple thicknesses designated at 10a and 10b in Figure 2, united marginally by other areas 11 and 12 of woven fabric of single thickness. This method of weaving is common and the areas 10 of multiple thicknesses are then relatively severed from each other by cutting along certain lines of single thickness. Preferably, the cutting line to open the pockets is immediately at the joined walls of double thicknesses, say along border line 20 shown in Figure 1. This will open the pockets. The severing of the bags along the lines 11 is not done until after filling of the bags, in accordance with the teaching set forth in my Patent 2,721,017, dated October 18, 1955, since it is intended to run a strip of pockets for quick filling under measured and controlled conditions. The finished bag B, shown in Figures 3 and 4 may have the margin at the opened end of the compartment 25 doubled upon itself, as indicated at 26, and suitably nylon thread stitched, as at 27, after the receptacle has been filled with coffee to the extent above described.

Nylon and viscose rayon used to produce the bags above described produces a fabric having a degree of smoothness which will enhance the filtering qualities of the coffee liquor during the brewing action. The bags have a glossy snow white appearance.

Various changes may be made to the forms of invention above described, and to the steps of the methods herein enumerated, without departing from the spirit of the invention or scope of the claim.

I claim:

A method of providing coffee packets for use in brewing coffee in coffee makers consisting in providing a sheet of porous fabric of woven viscose rayon yarn having a plurality of areas of multiple relatively movable pocket providing thicknesses united to each other along bounding areas of woven yarn of single thicknesses, with said multiple thickness areas disposed in consecutive linear arrangement, desizing and rendering the fabric chemically inert as to taste by boiling in pure water for the removal of substantially all oils, sizing and other taste affecting plasticizers and materials, cutting said fabric adjacent to said areas of single thicknesses through the multiple thickness areas in the direction of the linear arrangement to open said pockets along a margin of each of the same, and then severing the pockets one from another along intermediate connecting areas of single thicknesses.

References Cited in the file of this patent

UNITED STATES PATENTS

| | | |
|---|---|---|
| 1,947,523 | Hirschhorn | Feb. 20, 1934 |
| 2,010,993 | Ingram | Aug. 13, 1935 |
| 2,143,302 | Cross | Jan. 10, 1939 |
| 2,193,974 | Luckhaupt | Mar. 19, 1940 |
| 2,277,050 | Reed et al. | Mar. 24, 1942 |
| 2,407,549 | Gurwick | Sept. 10, 1946 |
| 2,531,594 | Abrahams | Nov. 28, 1950 |

FOREIGN PATENTS

| | | |
|---|---|---|
| 444,764 | Great Britain | Mar. 26, 1936 |

U. S. DEPARTMENT OF COMMERCE
PATENT OFFICE
CERTIFICATE OF CORRECTION

Patent No. 2,824,002                                  February 18, 1958

Earle F. Hiscock

It is hereby certified that error appears in the printed specification of the above numbered patent requiring correction and that the said Letters Patent should read as corrected below.

Column 1, line 28, strike out "of producing a method"; line 31, after "improved" insert -- method of producing a --; line 40, after "inert" insert -- as --; line 72, for "tppe" read -- type --; column 2, line 61, for "waves" read -- waxes --; column 4, line 22, for "opimum" read -- optimum --.

Signed and sealed this 1st day of April 1958.

(SEAL)
Attest:
KARL H. AXLINE
Attesting Officer

ROBERT C. WATSON
Commissioner of Patents